United States Patent [19]

Skjaeveland

[11] 4,400,994
[45] Aug. 30, 1983

[54] HINGE ASSEMBLY

[75] Inventor: Magne Skjaeveland, Klepp st., Norway

[73] Assignee: Kverneland A/S, Kvernaland, Norway

[21] Appl. No.: 335,834

[22] Filed: Dec. 30, 1981

[30] Foreign Application Priority Data

Feb. 11, 1981 [NO] Norway .................. 810457

[51] Int. Cl.³ ............................................ G05G 1/04
[52] U.S. Cl. ...................................... 74/520; 74/527; 212/188; 414/723
[58] Field of Search ................ 74/520, 527; 212/188; 414/723

[56] References Cited

U.S. PATENT DOCUMENTS

| | | | |
|---|---|---|---|
| 2,269,308 | 1/1942 | Gates et al. | 74/520 X |
| 4,127,203 | 11/1978 | Arnold | 414/723 |
| 4,265,587 | 5/1981 | Clark | 74/520 X |
| 4,297,908 | 11/1981 | Zimmer | 74/520 X |
| 4,303,012 | 12/1981 | McGlennon | 74/520 X |

Primary Examiner—Leslie A. Braun
Assistant Examiner—Frank H. McKenzie, Jr.

Attorney, Agent, or Firm—Schwartz, Jeffery, Schwaab, Mack, Blumenthal & Koch

[57] ABSTRACT

A first segment usually attached to a tractor is pivotally linked by a first bolt to a second pivotal segment. For example, which may be moved between an extended outward working position and a retracted, non-working inward position. A hydraulic cylinder and piston are mounted on the fixed segment and the free end of the piston is pivotally linked to the base of a substantially U-shaped member. One arm of the U-shaped member is pivotally linked to the fixed segment, and the other arm of the U-shaped member is pivotally linked to one end of a coupling member. The other end of the coupling member is pivotally linked to the pivotal segment. In the extended position, the arms of the U-shaped member pivot down wardly, and the end of the coupling member connected to the pivotal segment comes to rest between the arms of the U-shaped member in horizontal alignment with the links connecting the U-shaped member to the fixed segment and pivotal segment. Arms of the U-shaped member come to rest in a position substantially surrounding the bolt connecting the fixed segment to the pivotal segment, and the two segments are thereby locked in the extended position.

3 Claims, 2 Drawing Figures

HINGE ASSEMBLY

BACKGROUND OF THE INVENTION

1. Field of the Invention

The present invention relates to a hinge assembly especially for use with agricultural implements.

2. Prior Art

Harrows and other equipment are usually provided with pivotal segments which may be pivoted into retracted, inward positions for transportation and storage. In this connection it has proven difficult to keep these segments, being pivotal in outward and inward directions, in their proper working positions utilizing common hinge joints and hydraulic cylinders.

SUMMARY AND OBJECTS OF THE INVENTION

It is an object of the present invention to provide a hinge assembly especially for use with agricultural implements having pivotal segments which automatically lock the segments in the outward working position.

It is a further object of the invention to provide a locking hinge assembly which translates forces tending to pivot the extended implement in directions tending to stabilize the extended implement.

It is yet another object of the invention to provide a locking hinge assembly which remains locked if means for extending the assembly, such as a hydraulic cylinder, fails.

A first segment usually attached to a tractor is pivotally linked by a first bolt to a second pivotal segment, for example, which may be moved between an extended outward working position and a retracted, non-working inward position. A hydraulic cylinder and piston are mounted on the fixed segment and the free end of the piston is pivotally linked to the base of a substantially U-shaped member. One arm of the U-shaped member is pivotally linked to the fixed segment, and the other arm of the U-shaped member is pivotally linked to one end of a coupling member. The other end of the coupling member is pivotally linked to the pivotal segment. In the extended position, the arms of the U-shaped member pivot downwardly, and the end of the coupling member connected to the pivotal segment comes to rest between the arms of the U-shaped member in horizontal alignment with the links connecting the U-shaped member to the fixed segment and pivotal segment. Arms of the U-shaped member come to rest in a position substantially surrounding the bolt connecting the fixed segment to the pivotal segment, and the two segments are thereby locked in the extended position.

BRIEF DESCRIPTION OF THE DRAWINGS

The above and other objects of the invention will be better understood from the following description and accompanying drawings wherein.

DETAILED DESCRIPTION OF A PREFERRED EMBODIMENT

Figure 1:
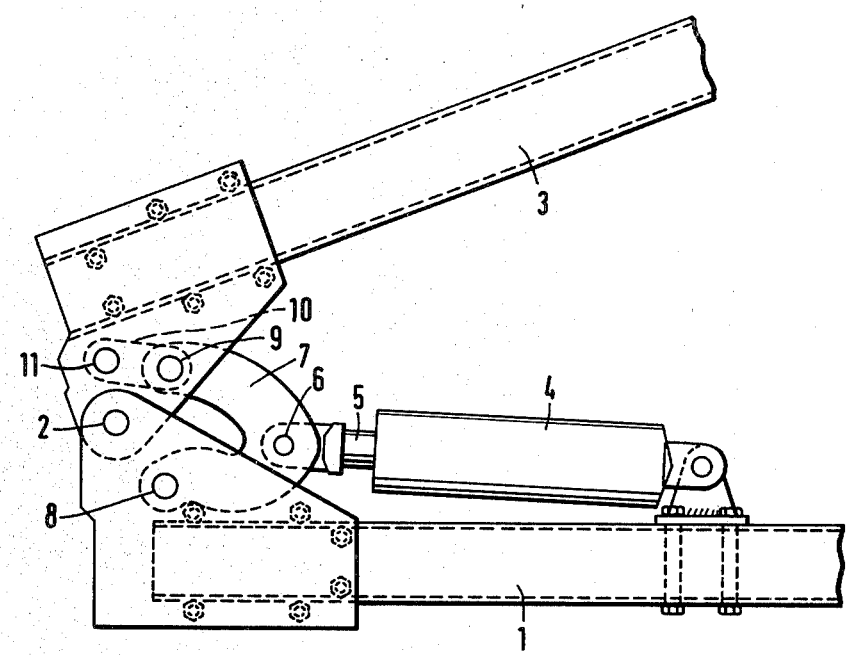
FIG. 1 is a side elevational view depicting a hinge assembly according to the present invention in its pivoted inward position, thereby inter-connecting fixed and pivotal segments of a harrow.

With reference to the drawing, reference numeral 1 denotes a fixed segment of a harrow. Segment 1 is connected to a pivotal segment 3 of the harrow through a first link means or bolt 2, segment 3 being pivotal in outward and inward directions by means of a hydraulic cylinder 4. One end of the hydrauliccylinder 4 is pivotally connected to the first segment 1, and a free end of a piston rod 5, associated with the cylinder 4, is pivotally connected by means of a second link means or bolt 6 to the base or bight portion of a substantially U-shaped member 7, one leg of which is pivotally connected to fixed segment 1 by means of a third link means or bolt 8. The opposite leg of U-shaped member 7 is pivotally connected by a fourth link means or bolt 9 to one end of a coupling member 10. The opposite end of coupling member 10 is pivotally connected to the pivotal segment 3 through a fifth link means bolt 11.

Figure 2:
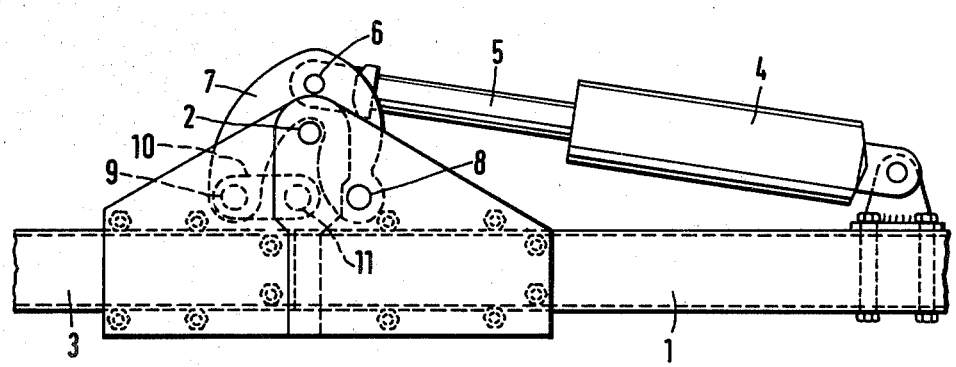
FIG. 2 is a side elevational view showing the hinge assembly of FIG. 1 locked in its pivoted outward position.

The operation of the assembly is as follows:

When the pivotal segment 3, in its pivoted inward position, as shown in FIG. 1, is to be rotated to its working outward position, as depicted in FIG. 2, piston rod 5 is pushed outward by actuating the hydraulic cylinder 4. This causes U-shaped member 7 to rotate in a counter-clockwise direction, as viewed in FIGS. 1 and 2, around the third bolt 8. The pivotal segment 3, being pivotally connected to U-shaped member 7 through coupling member 10, is thereby turned in a counter-clockwise direction, as viewed in FIGS. 1 and 2, about the first bolt 2 until the U-shaped member 7 engages first bolt 2, while third, fourth and fifth bolts 8, 9 and 11, respectively, are aligned, as shown in FIG. 2.

In this position pivotal segment 3 is firmly locked, even if the hydraulic cylinder 4 should fail. Accordingly, in the position depicted in FIG. 2, neither upward nor downward forces acting on pivotal segment 3 are transferred to the hydraulic cylinder 4 and associated piston rod 5. On the other hand, such forces will strain the U-shaped member 7 through the third and fourth bolts 8 and 9, respectively, whereby an upward direction load on pivotal segment 3 will produce a horizontal force exerted on fourth bolt 9 in a direction away from segment 1, while a downward load on pivotal segment 3 will produce a horizontal force acting on fourth bolt 9 toward the fixed segment 1, right, as viewed in FIG. 2.

To turn the pivotal segment 3 from its pivoted outward position according to FIG. 2 to its retracted inward position for transportation, as shown in FIG. 1, hydraulic cylinder 4 is actuated, whereby piston rod 5, associated with hydraulic cylinder 4, is retracted, causing clockwise rotation of U-shaped member 7 about the third bolt 8. Thereby the pivotal segment 3 is rotated through coupling member 10 in a clockwise direction about the first bolt 2 to its transport position.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

I claim:

1. A hinge assembly for use with extendable implements and the comprising:
   (a) a fixed segment,
   (b) a pivotal segment,
   (c) first link means pivotally connecting said fixed segment to said pivotal segment,
   (d) extending means mounted on said fixed segment,
   (e) a substantially U-shaped member having two legs and a bight portion,
   (f) second linking means pivotally connecting said bight portion to said extending means,
   (g) third linking means pivotally connecting one leg of said substantially U-shaped member to said fixed segment,
   (h) a coupling member having first and second ends,
   (i) fourth linking means pivotally connecting the other leg of said substantially U-shaped member to said first end of said coupling member,
   (j) Fifth linking means connecting said second end of said coupling member to said pivotalsegment; whereby when said pivotal segment is extended in line with said fixed segment, said second end of said coupling means is aligned intermediate to the legs of said substantially U-shaped member, and said first linking means is aligned substantially intermediate said bight portion of said substantially U-shaped member and said second end of said coupling means.

2. The apparatus of in claim 1, wherein said extending means is a hydraulic cylinder and piston, said piston being pivotally connected by said second link means to said bight portion of said substantially U-shaped member and said cylinder mounted on said fixed segment.

3. The apparatus of claim 1 or 2 wherein each of said link means is a bolt.

* * * * *